J. W. GILBERT.
Hand-Piece for Dental-Engines.
No. 199,431. Patented Jan. 22, 1878.
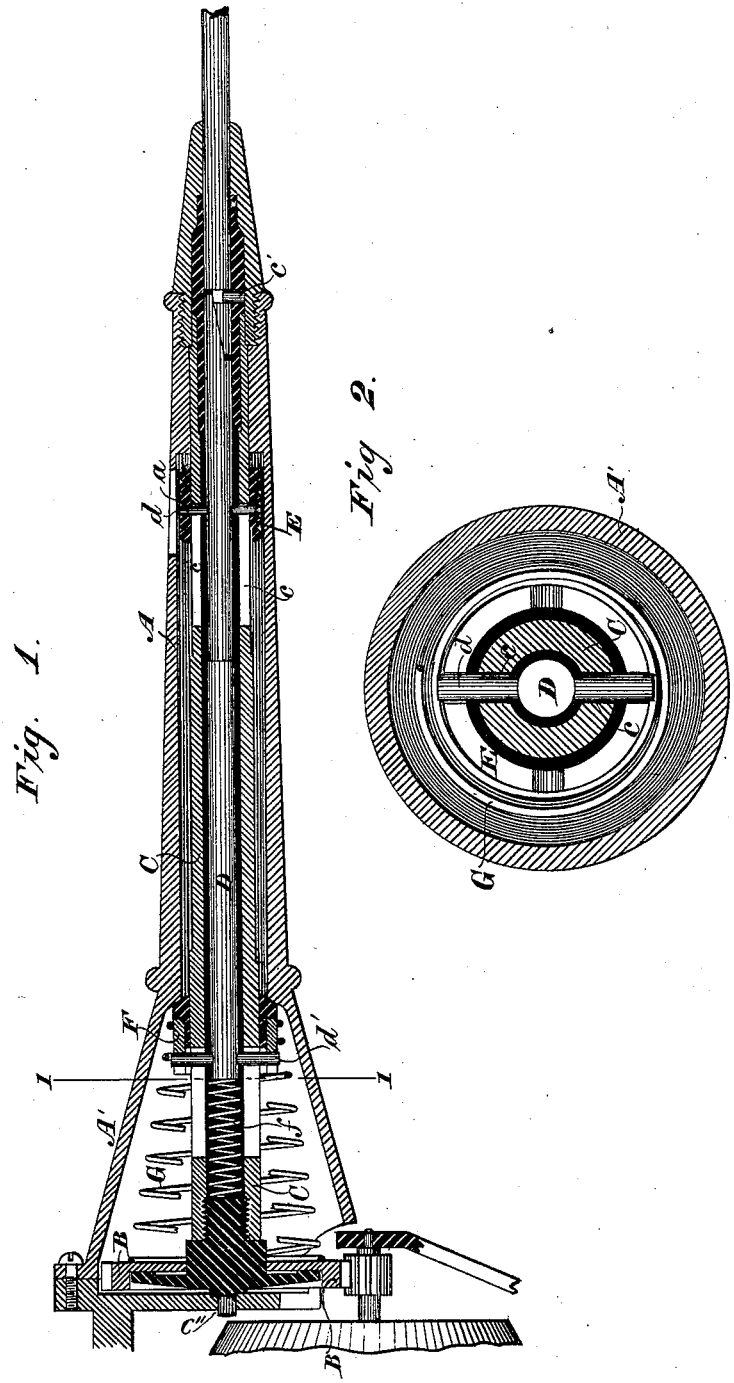
WITNESSES
Wm A Skinkle
Geo W Breck
INVENTOR
John W Gilbert
By his Attorneys,
Baldwin, Hopkins & Peyton

UNITED STATES PATENT OFFICE.

JOHN W. GILBERT, OF PHILADELPHIA, PENNSYLVANIA, ASSIGNOR TO SAMUEL S. WHITE, OF SAME PLACE.

IMPROVEMENT IN HAND-PIECES FOR DENTAL ENGINES.

Specification forming part of Letters Patent No. 199,431, dated January 22, 1878; application filed December 1, 1877.

*To all whom it may concern:*

Be it known that I, JOHN W. GILBERT, of the city and county of Philadelphia, and State of Pennsylvania, have invented certain new and useful Improvements in Dental-Engine Hand-Pieces, of which the following is a specification:

My invention relates to that class of dental-engine hand-pieces having a rotating chuck or tool-holder mounted in a casing, and provided with means for locking and unlocking the operating-tool, and also for disconnecting the tool-holder from the driving-power.

The object of my invention is to enable the operator, without releasing his grasp from the hand-piece, simultaneously to stop the rotation of the tool-holder and to unlock the fastenings which secure the tool inside the holder, which ends I attain by mounting in the hand-piece a rotating tool-holder provided with clutch mechanism, which simultaneously disconnects the tool-holder from its driving-power, and unlocks the tool.

In the accompanying drawings my improvements are shown as adapted to an electric engine similar to that shown in Letters Patent No. 158,635, granted to me January 12, 1875. Obviously, however, the hand-piece may be applied to engines differing in construction and driven in different ways from that herein shown.

One of the principal applications of my improvement is that to the well-known S. S. White dental engine, in which a hand-piece is connected with a flexible non-rotating sheath, while the rotary tool-holder is driven by a flexible shaft.

Figure 1 represents a longitudinal central section through a hand-piece embracing all my improvements embodied in the best way now known to me, and Fig. 2 a transverse section therethrough on the line 1 1 of Fig. 1, looking toward the nose of the hand-piece.

The casing A of the hand-piece may be made in any of the usual well-known ways, its base A', in this instance, constituting a frame to support a driving-gear, B, mounted upon a rotating tubular chuck, mandrel, or tool-holder, mounted in suitable bearings in the casing A. A rod, D, capable of moving freely endwise in the chuck or tool-holder, is connected by a cross-pin, $d$, with a collar, E, capable of sliding freely endwise on the chuck C inside the casing, being readily accessible by the operator through a slot, $a$, in the casing A. The pin $d$ works through a longitudinal slot, $c$, in the chuck C, thus causing the chuck C and rod D to turn freely together without interfering with the free endwise movement of the latter relatively to the former.

A cross-pin, $d'$, on the rear end of the rod D ordinarily interlocks with a notch in a collar, F, encircling the chuck C. A spring, $f$, inclosed within the chuck C, tends to keep the pin of the rod D normally in contact with the notch in the collar F.

The chuck C, it will be observed, at its rear end revolves on a trunnion, $C''$, in the frame. The driving-gear B turns loosely on a hub of the chuck C, and is connected with the sleeve F by means of a helical driving-spring, G, encircling the chuck. Consequently, when the pin $d'$ is disconnected from the driving collar or shaft by moving the rod D backward endwise, the collar F is permitted to turn freely on the chuck C without revolving it, and the rotation of the tool consequently ceases.

The forward end of the rod D is wedge-shaped, and the tool-shank is made with a corresponding incline, and with a transverse groove therein. The tool-chuck C is provided with a stud or pin, $c'$, projecting into its bore, so that the tool-shank, when inserted in the chuck and partially rotated, is locked by the pin engaging in the groove, and still further locked by the forward movement of the wedge-shaped end of the endwise-moving locking-rod D. This mode of fastening the tool, however, is not herein claimed, being shown in Letters Patent No. 158,170, granted to me December 29, 1874.

In the drawings, the tool is shown as locked in its socket with the parts in their working position, in which the chuck C, the locking-rod D, and the tool-shank all rotate together.

In order simultaneously to stop the mandrel and to unlock the tool from its fastening, the operator inserts his nail through the slot $a$ in the casing, and retracts the slide E, which moves the locking-rod D endwise, releasing its front wedge-shaped end from the tool-shank, and at the same time freeing the cross-pin $d'$ from the groove in the collar F, thus unclutching the driving mechanism. The tool may then readily be removed or replaced.

If desired, the tool can be allowed to remain, and when the operator releases the locking-rod it is at once thrown into gear again by its spring $f$, and the tool locked as before.

I have described the disconnecting movements as being effected by a sliding collar inside the casing, which construction is preferable on some accounts; but it is obvious that the same result would be attained by a ring sliding on the outside of the casing, or by a lever pivoted on the hand-piece and extending back to the clutch, somewhat on the plan shown in my patent of January 12, 1875, above mentioned.

I claim as my invention—

1. The combination, substantially as hereinbefore set forth, in a dental-engine hand-piece, of the casing, the rotary chuck or tool-holder, and its clutch and tool-locking devices, which simultaneously release the tool and disconnect the driving mechanism by a single movement.

2. The dental-engine hand-piece hereinbefore described, consisting of the combination of the casing, the rotary chuck or tool-holder, the driving shaft or spring, a clutch interposed between the chuck and shaft, and a tool-locking device carried by the chuck and connected with the clutch, whereby a single movement is sufficient to operate both clutch and tool-lock.

In testimony whereof I have hereunto subscribed my name.

JOHN W. GILBERT.

Witnesses:
A. P. ROOT,
J. A. B. WILLIAMS.